United States Patent [19]

Yamashita

[11] Patent Number: 5,636,007
[45] Date of Patent: Jun. 3, 1997

[54] METHOD OF REPRODUCING IMAGES OF PLURALITY OF COPY PAGES ON SINGLE PLATE

[75] Inventor: Koji Yamashita, Tokyo, Japan

[73] Assignees: Mitsubishi Paper Mills Limited, Chiyoda-ku; Hirakawa Kogyosha Co., Ltd., Tokyo, both of Japan

[21] Appl. No.: 113,517

[22] Filed: Aug. 30, 1993

Related U.S. Application Data

[63] Continuation of Ser. No. 551,264, Jul. 12, 1990, abandoned.

[30] Foreign Application Priority Data

Jul. 13, 1989 [JP] Japan ................................. 1-181449

[51] Int. Cl.$^6$ ....................................... G03B 27/32
[52] U.S. Cl. ................................................. 355/77
[58] Field of Search ............................... 355/54, 40, 41, 355/77

[56] References Cited

U.S. PATENT DOCUMENTS

| | | |
|---|---|---|
| 3,837,742 | 9/1974 | Wally, Jr. . |
| 3,920,333 | 11/1975 | Wally, Jr. . |
| 3,998,546 | 12/1976 | Wally, Jr. et al. . |
| 4,232,962 | 11/1980 | Sauer ........................... 355/54 |
| 4,588,291 | 5/1986 | Lulay et al. . |
| 4,645,334 | 2/1987 | Shimada et al. ............. 355/54 |
| 4,737,825 | 4/1988 | Davis ........................... 355/54 |
| 4,746,956 | 5/1988 | Holroyd et al. ............. 355/54 |

FOREIGN PATENT DOCUMENTS

| | | |
|---|---|---|
| 0295681 | 12/1988 | European Pat. Off. . |
| 0348908 | 1/1990 | European Pat. Off. . |

OTHER PUBLICATIONS

Patent Abstracts of Japan; vol. 6, No. 159 (P–136)(1307) 20 Aug. 1982 & JP-A-57 078 035 (Dainippon Screen Seizou K.K.) 15 May 1982.

*Primary Examiner*—David M. Gray
*Attorney, Agent, or Firm*—Cushman, Darby & Cushman IP Group of Pillsbury Madison & Sutro LLP

[57] ABSTRACT

A final format used in reproducing images of a plurality of pages of copies on a single plate is prepared through steps of preparing a plurality of kinds of patterns for reproducing the images by inputting various data required for preparing the patterns; selecting an arbitrary pattern from the prepared patterns for reproducing the images; and inputting various dimensional data.

7 Claims, 7 Drawing Sheets

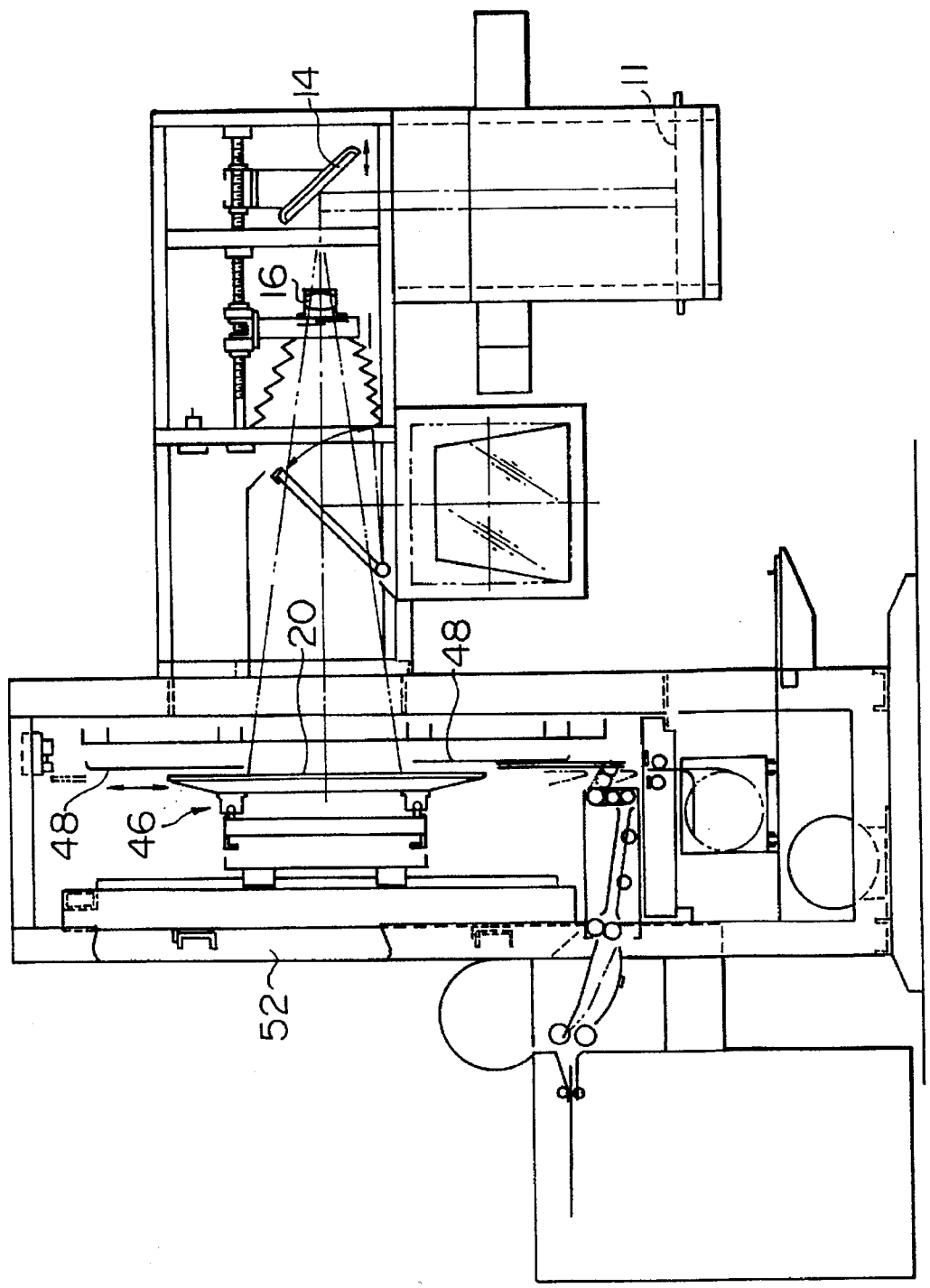

METHOD OF REPRODUCING IMAGES OF PLURALITY OF COPY PAGES ON SINGLE PLATE

This is a continuation of application Ser. No. 07/551,264, filed on Jul. 12, 1996, which was abandoned upon the filing hereof.

BACKGROUND OF THE INVENTION

The present invention relates to a method of reproducing images of a plurality of pages of copies or originals on a single plate or film with the images suitably positioned and oriented on the plate, and can be applied, for example, to a process camera for plate making.

Process cameras for reproducing images of a plurality of pages of originals on a single plate, for example, a photosensitive member, are already known, for example, from U.S. Pat. Nos. 3,998,546, 3,837,742 or 3,920,333.

In case the photosensitive member, on which images of a plurality of pages of originals have been photographed, is a film for a direct machine plate, the film is subjected to an exposure process from its reverse side, while in case of a film for other than the direct machine plate, to an exposure process from its obverse side. Then, in each case, the film is subjected to a contact printing process with a masking film overlaid thereon. In case of a film for direct machine plate, the processed member is used directly as a plate for printing. In case of a film for other than the direct machine plate, the processed member is again subjected to another contact printing process with a PS plate or the like overlaid thereon, and then used as a plate for printing.

A paper printed on its obverse and reverse surfaces by using a plate prepared in the above-mentioned manner is sent to a bookbinding process, where the paper is folded several times according to a predetermined sequence, and binded along a predetermined side, the remaining three sides being cut along predetermined lines. The papers printed and cut in the above manner are required to have pages arranged in regular order and top edges having the same direction or orientation. In consequence, according to the requirements for bookbinding after printing, and to the dimensions of various parts of the book and so on, there are various methods for arranging page images on a single photosensitive member by use of a process camera.

In this specification, the term "pattern" means information relating to page arranging layout, including such as page order, direction of page top edge, data relating to signatures, order of page exposure, gripping direction of printing machine, and so on.

FIGS. 6 to 12 show roughly classified patterns prepared for arranging images of 8 pages of copies or originals on a single plate by using a process camera for plate making. In every patterns, the plate is gripped along the lower side. Numeral 10 denotes areas for reproducing signatures. Numerals on the arranged pages denote page numbers, and the direction of the numeral indicates the direction from top edge to bottom edge of the page.

The patterns shown in FIGS. 6 to 9 are called as "sheet-wise" or "sheet work". FIGS. 6A, 7A, 8A and 9A show outer forms; i.e., plates for printing images on the obverse surface of a sheet of printing paper, while FIGS. 6B, 7B, 8B and 9B show inner forms; i.e., plates for printing images on the reverse surface of a sheet of printing paper. In the pattern shown in FIG. 6, all of the arranged pages have different page numbers. The pattern shown in FIG. 7 is called as "two sets for the same plate type". The pattern shown in FIG. 8 is called as "two sets for different plates type". The pattern shown in FIG. 9 is called as "four sets for the same plate type". Assuming from the above, there are counted 24 kinds of patterns for "four sets for different plates type", while 6 kinds of patterns for "four sets for a pair of the same plates type".

FIGS. 10 to 12 show patterns which are called as "half sheet" or "work and turn", where a plate is commonly used for printing on an obverse surface and a reverse surface. In the pattern shown in FIG. 10, pages to be arranged are different from each other. FIG. 11 shows a pattern of "two sets type", while FIG. 12 a pattern of "four sets type".

In addition to the above-mentioned examples, there exist patterns which are similar to those shown in FIGS. 6 to 8 and FIG. 10, but have gripping edges at the reverse side. Further, although, in the above-mentioned examples, the pages are bound at the left side, and folded at the top side, it is also possible to bind at the left side and fold at the bottom side, or to bind at the right side and fold at the bottom side. In addition, it is also possible to bind the pages laterally with the top sides directing left and right. With respect to the folding method, there are various methods, in addition to the usual folding method, such as zig-zag folding, wind folding, web offset printing press folding, and other methods practiced in foreign countries.

When various factors are taken into consideration as mentioned above, several hundreds of patterns may be assumed, even in case 8 pages of originals are to be arranged-or reproduced on one surface of a plate. Further, this number is counted only in relation to the kinds of the patterns. When format data including size of the plate, size of the page, breadth of the gutter, breadth of gripping, and various sizes are taken into consideration, the number of kinds may become enormously great.

By the way, the present applicant has developed a process camera capable of reproducing images of a plurality of pages of copies or on a single photosentive member, which comprises a platen for holding the photosensitive member, the platen being movable in X and Y directions in a plane parallel to the photosensitive member holding plane, and vertically movable mask plates and horizontally movable mask plates, and in which the positions and the areas of the reproduced images of originals are determined by moving the platen and the mask plates. An example of this process camera is disclosed in U.S. Pat. No. 4862223, and is shown in FIG. 5 in brief. In FIG. 5, numeral 11 denotes a subject holder having a horizontal plane for holding the copy or original thereon. Above the subject holder 11 is disposed a mirror 14 slanted with an inclination of 45° for deflecting the light reflected from the original disposed on the subject holder 11 into a horizontal direction and for reversing the image.

An object lens 16 and a platen 20 are positioned on the path of light coming from the subject holder 11 and reflected by the reverse mirror 14. The platen 20 is disposed in a camera housing 52 for positioning a relatively large film piece F which is used as a film or a machine plate. The film piece is held at a predetermined position in a vertical plane of the platen by using an air suction device. The platen 20 can be moved in two mutually perpendicular directions, i.e., in X and Y directions, in one vertical plane by means of an X/Y moving device 46. The movement of the platen 20 in X and Y directions is carried out by rotating feed screws (not shown) by use of stepping motors. A mask 48 is disposed just in front of the film holding surface of the platen 20. The mask 48 comprises two mask plates disposed at upper and lower positions and independently movable vertically, and other two mask plates disposed at laterally spaced positions and independently movable horizontally. The upper, lower, and lateral boundary edges of the area in which an image is to be reproduced on the film piece F are defined by these four mask plates of the mask 48. The mask plates are moved under control of stepping motors.

By positioning and hodling the film piece F on the platen 20 and by moving the platen 20 in X and Y directions, the position at which the image of the original held on the subject holder 11 is reproduced on the film piece F can be arbitrarily determined. Further, by moving the upper and lower mask plates and the left and right mask plates in a vertical direction and in a horizontal direction, respectively, the reproducing area extending vertically and horizontally and locating at the above-mentioned reproducing position can be arbitrarily determined.

In a process camera as shown in FIG. 5, by controlling the position of the platen 20 and the vertical and horizontal positions of the mask plates, images of a plurality of pages of originals and signatures can be reproduced on a single plate with patterns as shown in FIGS. 6 to 12, or other arbitrary pattern. To be concrete, the image reproduction with a desired pattern and desired format data is carried out by sequentially controlling the stepping motors through a microcomputer for moving the platen 20 and the upper, lower, left, and right mask plates.

A set of the total data including pattern data and format data required for reproduction of images is referred to as "final format" hereinafter.

In order to sequentially control the stepping motors through the microcomputer, it is required to determine the reproducing pattern and format data in advance. Therefore, heretofore, various final formats are prepared and stored in advance, and from among them one desired final format is selected and used.

These final formats are, however, so-called ready-made ones, and can not be used, when the desired final format includes data different from those appearing in a corresponding ready-made one. Further, as mentioned before, there are various kinds of multi-page reproducing patterns and format data, and, in addition, some patterns and format data originated by users of the process camera. When these circumstances are taken into consideration, it is considered very difficult to prepare all of the necessary final formats beforehand.

SUMMARY OF THE INVENTION

The object of the present invention is to solve the above-mentioned problems and to provide a method of reproducing images of a plurality of copy pages on a single plate in which an arbitrary final format can be prepared as desired, and which, accordingly, has a substantially infinite range of application to such as a process camera for printing plate.

For achieving the above-mentioned object of the present invention, a method of reproducing images of a plurality of pages of copies according to the present invention is characterized in that the data required for reproducing the images are divided into a pattern data group and a dimensional data (format data) group, and the final format is prepared by selecting suitable data from these data groups, and inputting the same. To be concrete, firstly, various patterns for reproducing the images are prepared by inputting various data required for reproducing the images, and a final format is prepared by inputting various dimensional data (format data).

It may be also possible to prepare a final format by preparing in advance various patterns for reproducing the images, and inputting various dimensional data (format data).

Since patterns for reproducing the images are prepared by inputting various necessary data, a desired pattern can be arbitrarily prepared. Final formats are prepared by inputting various dimensional data (format data) into the prepared various patterns. Since a pattern and a format datum can be arbitrarily determined and arbitrarily combined with each other, a desired final format for reproducing multiple-page images can be obtained in a wide range of variety.

Even in case various patterns for reproducing the images are prepared in advance, since the format data can be arbitrarily determined, there can be obtained a greater number of final formats for reproducing multiple-page images in comparison with the methods for reproducing the images of prior arts.

BRIEF DESCRIPTION OF THE DRAWINGS

FIG. 5 is a side view of a process camera to which the present invention can be applied, FIGS. 6A and 6B to FIG. 12 are front views showing various patterns for reproducing multiple images.

DESCRIPTION OF THE PREFERRED EMBODIMENT

Referring to FIGS. 1 to 4, a method for reproducing multiple page images on a plate according to an embodiment of the present invention will be described below. The process for reproducing multiple page images according to the present invention is roughly divided into a pattern preparing process and a final format preparing process.

Figure 1:
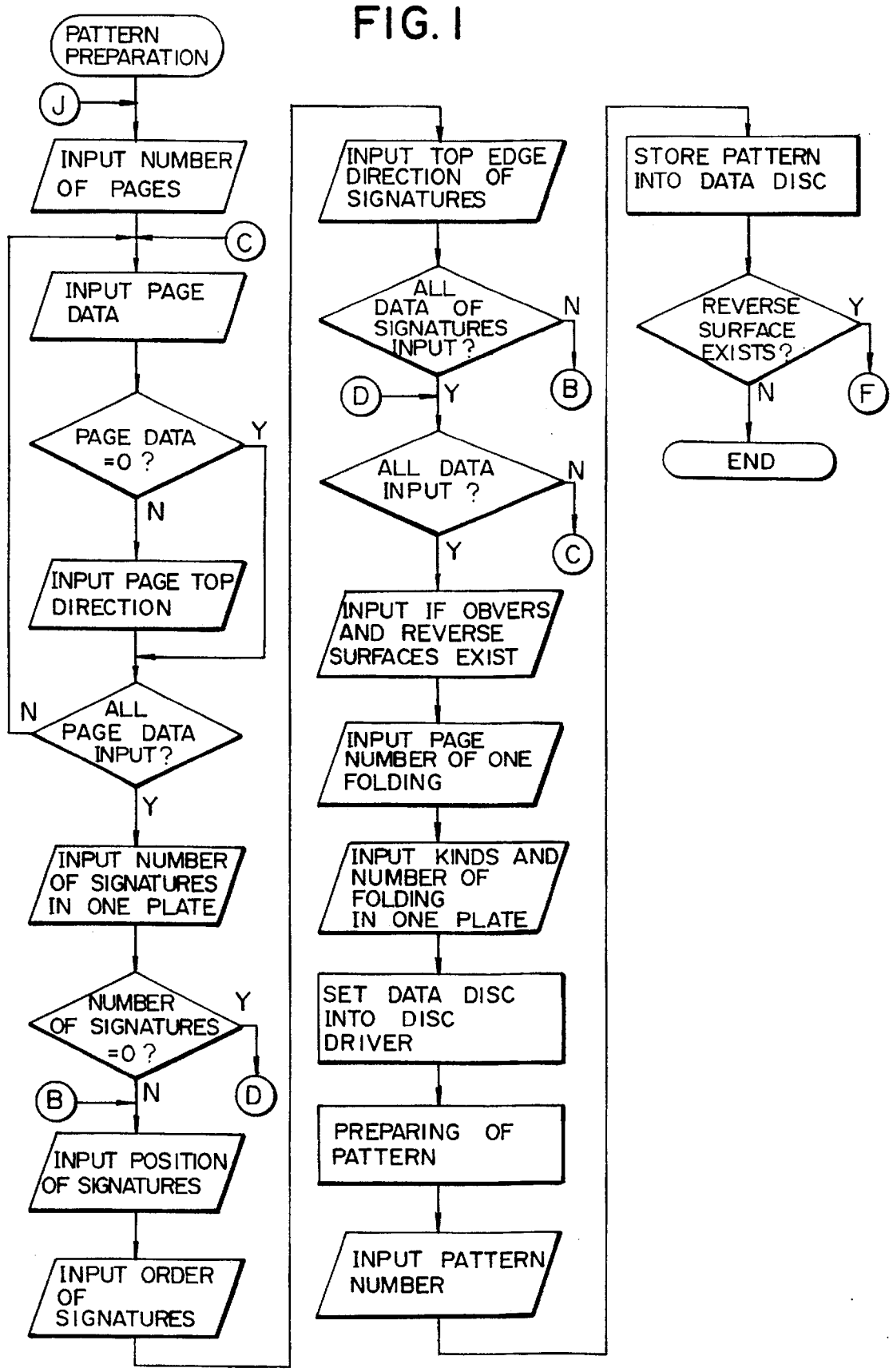
FIG. 1 is a flow chart for preparation of a pattern included in a method of reproducing multiple images according to the present invention.

In a pattern preparing operation shown in FIG. 1, number of pages to be reproduced on a single photosensitive member is firstly input, and then, page data are input. Here, the term "page data" means page numbers for pages to be reproduced on the photosensitive member, and the page data for the obverse and reverse surfaces of the first plate are input. In case the page data are input, directions of page tops or top edges are next input, while in case no page data are input, it is omitted to input directions of page tops or top edges. After all page data have been input, the number of signatures for one plate is input, and then, the position, the order, the top edge direction of each signature are input. When these data of each of the signatures have been input, it is confirmed whether all of the necessary data have been input or not. When the all data have not been input, additional required data are repeatedly input, and then, after the inputs are completed, information relating to whether the difference between obverse and reverse surfaces exists or not, and page number of one folding are input. Here, the term "page number of one folding" means number of pages printed on a sheet which has been folded in a predetermined sequence in a book binding process. In the before-mentioned patterns of "2 sets type" and "4 sets type", the page number of one folding decreases as the set number increases. Next, number and kinds of folding in one plate is input, thereby completing the data input process required for preparing a pattern. Next, a data disc is set into a disc driving device for conducting a pattern preparation operation. Then, a number to be attached to the prepared pattern is input, and the pattern is stored in the data disc. The stored pattern is read out when a final format is to be prepared, as will be explained later. Next, in case no reproduction on a reverse surface is required, the pattern preparation work is finished, while in case a reproduction on a reverse surface is required, a pattern preparation work shown in FIG. 2 is required to follow.

Figure 2:
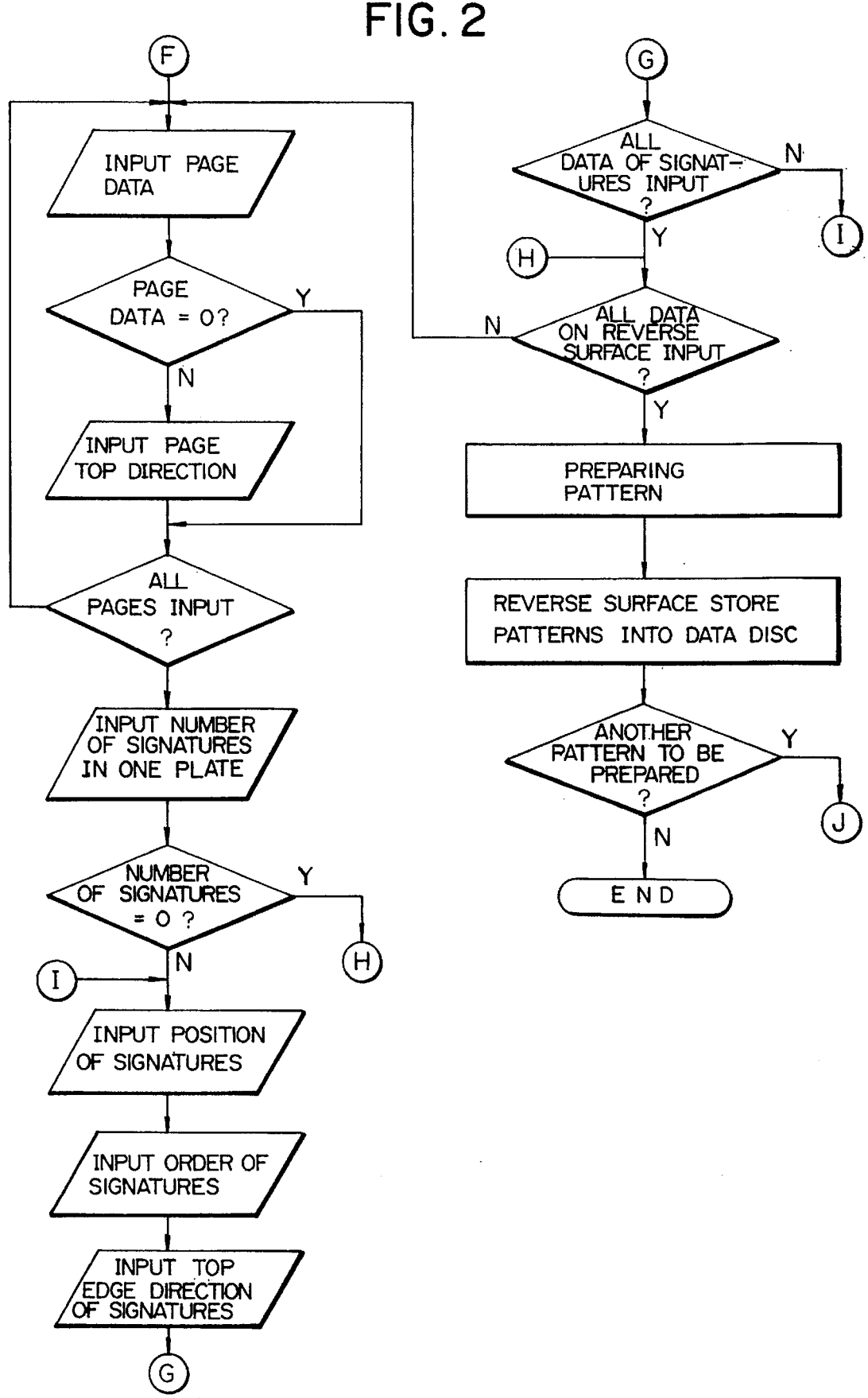
FIG. 2 is a flow chart following to that of FIG. 1.

The pattern preparation work for a reverse surface shown in FIG. 2 is similar to that shown in FIG. 1, and page data, page top edge directions, and data relating to the number, position, order, top direction of the signatures are input. After the input of all data relating to reproduction on a reverse surface is completed, a pattern preparation work is carried out and the pattern is stored into the data disc. In case another pattern is to be prepared, the process shown in FIG. 1 is repeated from the beginning, while in case no other pattern is required, the pattern preparation work is finished.

Figure 3:
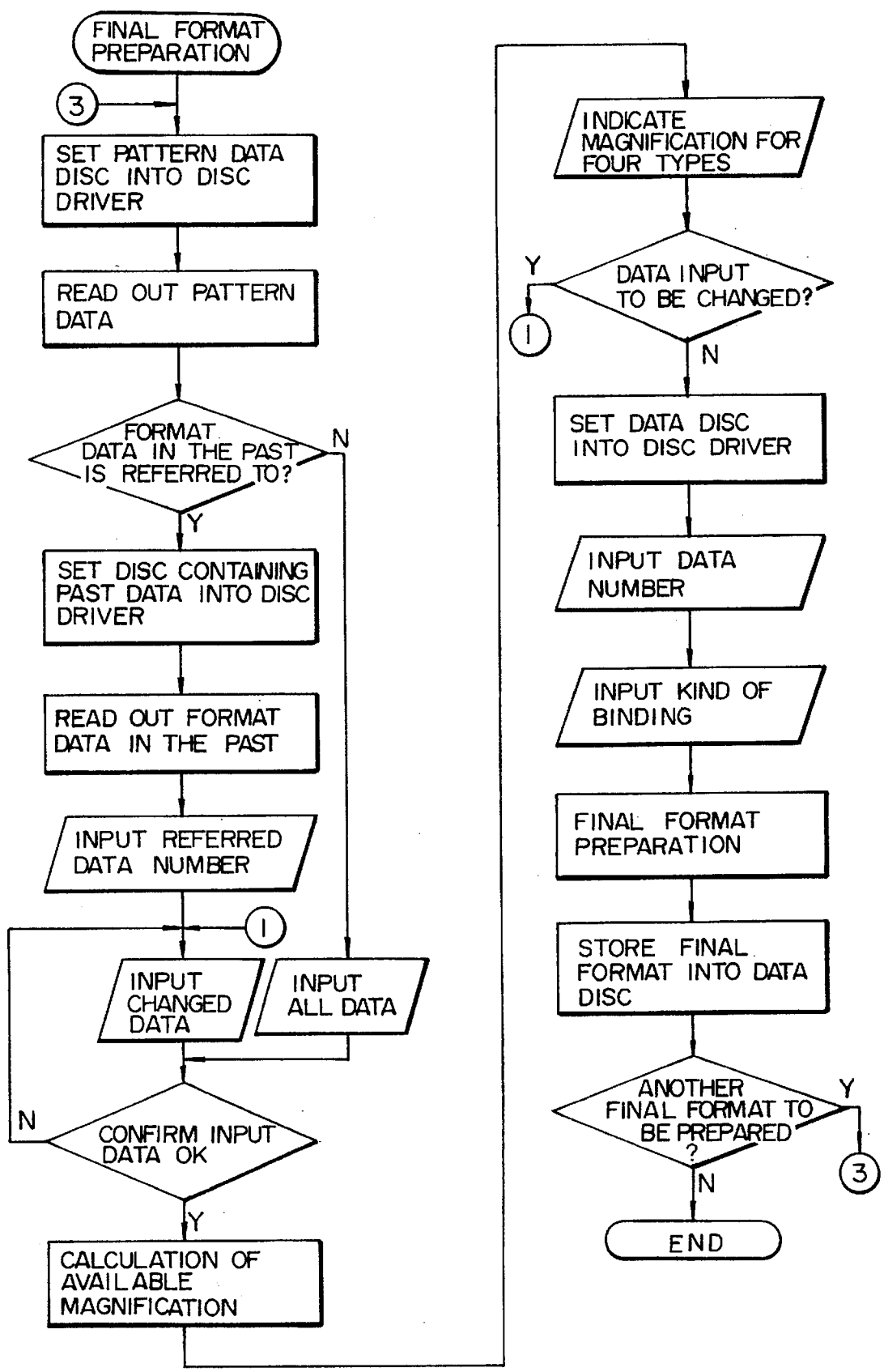
FIG. 3 is a flow chart for preparation of a final format included in a method of reproducing multiple images according to the present invention.

Next, referring to FIG. 3, a final format preparation work is described. In a final format preparation, a disc in which pattern data are stored is firstly set into a disc driving device, and the pattern data are read out and input. Then, whether format data in the past are to be referred to or not is determined. When no format data in thepast are referred to, all data required for preparing a final format are input. The all data (format data) required for preparing a final format includes data of breadth and length of photosensitive member, page size (longitudinal and lateral dimensions), breadth of each gutter, breadth of gripping portion, breadth for photographing standard marks for folding, which is so-called as register mark, breadth for photographing signatures, and other various necessary dimensional data.

On the other hand, when format data in the past are to be referred to, a disc storing the data in the past is set into the disc drive device. By inputting the data number of the data to be referred to, the data is read out and data to be changed are input. After inputting the changed data, or after inputting the above-mentioned all data required for preparing a final format, the input data are confirmed. When the input data are required to be changed, the data are changed, while, when no change of the input data is required, available or adoptable magnification is calculated, and a range of variation of the magnification is indicated for four types of plate peripheral burning out. Next, whether the data input is to be changed or not is confirmed. When the data input is to be changed, the process is returned to the input step for changed data, while, when no data input is to be changed, a final format is prepared by setting the data disc into the disc drive drvice, inputting the data number, and inputting data relating to kinds of book binding, and stored into the data disc. The stored final format is read out at the time of photographing by a process camera as will be described later. After these processes, when another final format is to be prepared, the final format preparation work is repeated from the beginning, while, when no other final format is required, the final format preparation work is finished.

Figure 4:
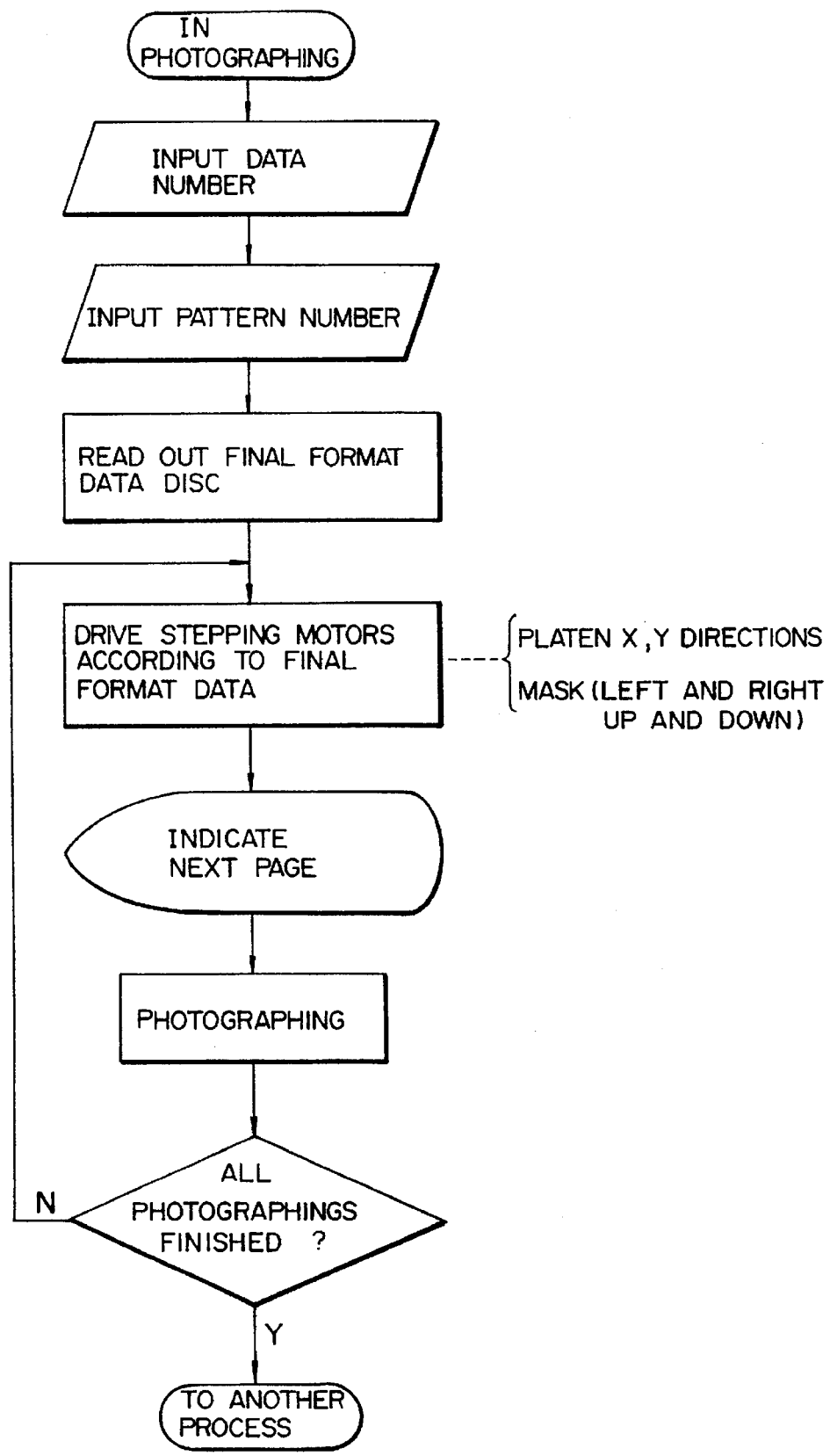
FIG. 4 is a flow chart of an operation sequence in photographing according to a final format.
Figure 6A:
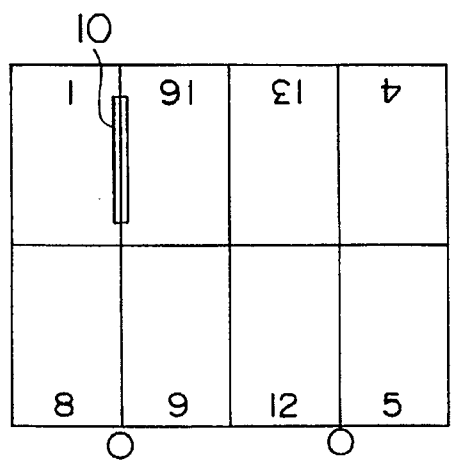
Figure 6B:
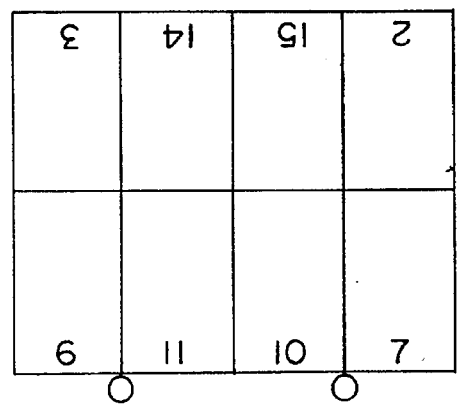
Figure 7A:
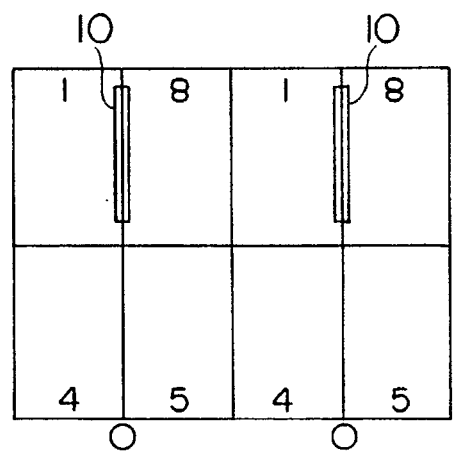
Figure 7B:
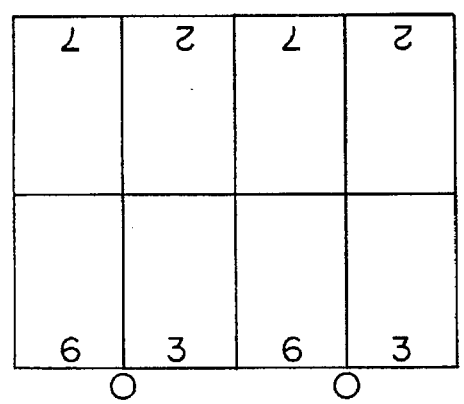
Figure 8A:
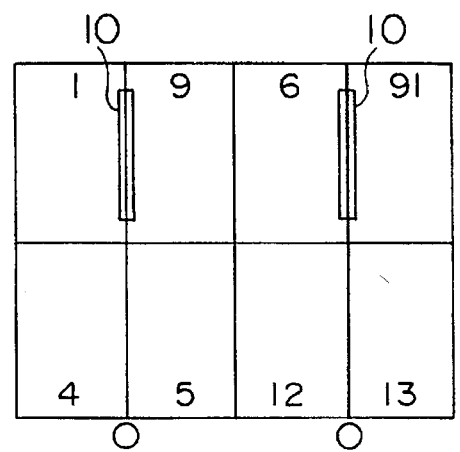
Figure 8B:
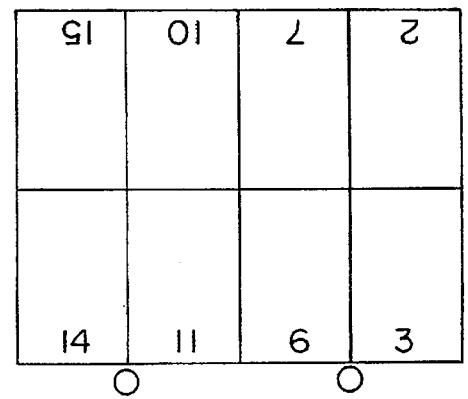
Figure 9A:
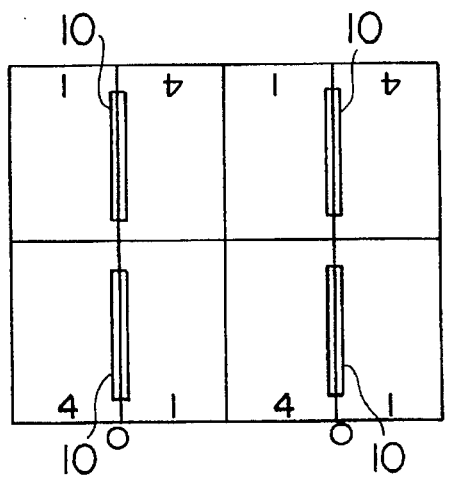
Figure 9B:
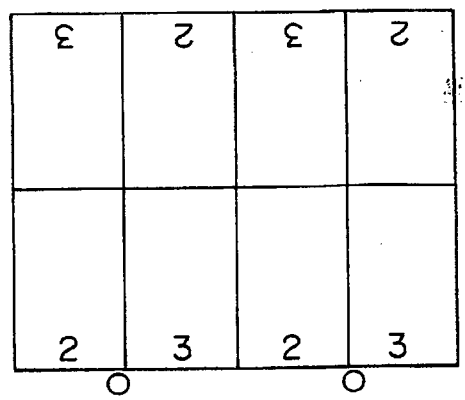
Figure 10:
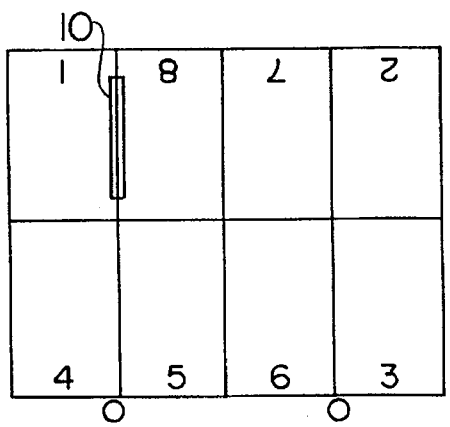
Figure 11:
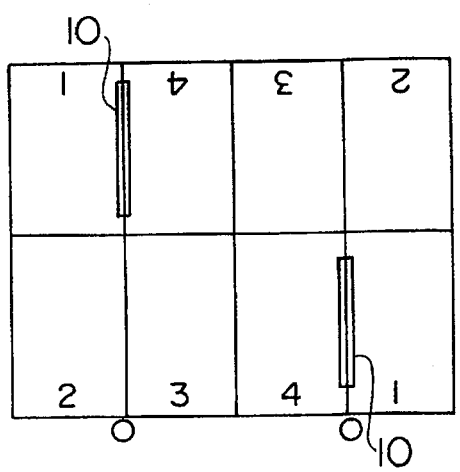
Figure 12:
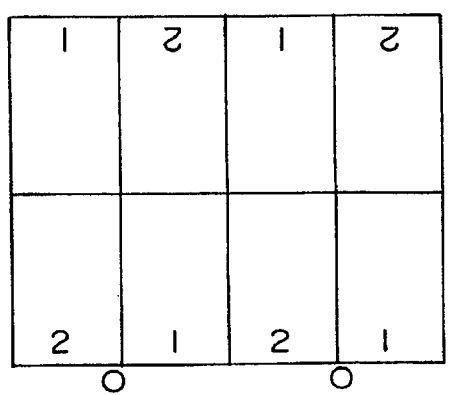

The pattern data and format data stored in the data disc are utilized when images of a plurality of copy pages are reproduced on a single photosensitive member. As shown in FIG. 4, in photographing process, data number and pattern number are firstly input, and then a final format is read out from the data disc and input. here, the term "final format" means a final format data including also pattern data. The final format defines the positions and the area of original text portions and gutters to be reproduced on a single photosensitive member and positions of signatures and register marks. Therefore, photographing positions and photographing areas on a single photosensitive member are determined by driving a stepping motor, on the bases of the final format, for moving the platen in X and Y directions and driving other stepping motors for moving the mask plates vertically and horizontally. The positions of the platen and the mask plates are determined by step number of the respective stepping motors controlled by a microcomputer. Next, a photographing is carried out after a next photograph page is indicated. Photographing is repeated for each original page with positions and areas of the reproduced pages determined by driving the stepping motors. After all photographings are completed, other processes, for example, such as forming positioning holes on the photographed photosensitive member, transferring the photosensitive member to a developing section, and so on, are carried out.

As mentioned above, according to this embodiment, it is possible to prepare arbitrary patterns for reproducing multiple images by inputting arbitrary pattern data in a pattern preparing process, and to prepare a final format by inputting arbitrary dimensional data (format data) into the above-mentioned patterns. In other words, various final format for reproducing multiple images can be prepared by combining an arbitrary pattern with an arbitrary format data. Therefore, even if there is any special pattern or format datum originated by a user of the process camera, this problem can be flexibly treated.

Further, it is also possible to prepare a final format by storing various patterns in advance, and inputting arbitrary format data thereinto. In this case, although the patterns are composed of ready-made ones, arbitrary format data can be input. As a result, the number of available final formats in this case can be considerably increased in comparison with that in a prior art where the final patterns are prepared and stored in advance, and a desired final format must be selected from them.

The present invention can be applied not only to process cameras of the type shown in FIG. 5, but also to those of other types.

The method for reproducing multiple images according to the present invention can be applied not only to process cameras, but also to devices for contact printing a plurality of gages on a plate.

According to the present invention, since various final formats for reproducing multiple images can be prepared by combining arbitrary patterns with arbitrary format data, the number of final formats which can be applied to such as process cameras can be enormously increased. Further, even if there are any special patterns or format data originated by user of the process camera, this problem can be flexibly treated.

Further, in case a desired final format is prepared by selecting a suitable pattern from among the various patterns prepared and stored in advacne, and inputting arbitrary format data thereinto, the number of available final formats in this case can be considerably great in comparison with that in a prior art where a desired final format must be selected from ready-made final formats, because arbitrary format data can be input in this case.

What is claimed is:

1. A method of producing images of a plurality of pages of copy on a single photosensitive member comprising the steps of:

classifying data required for producing the images into pattern data defined as the data relating to a layout of the plurality of pages of copy and format data defined as the data relating to a size of the pages of copy;

inputting into a computational device the pattern data;

preparing a plurality of patterns for laying out the image of the plurality pages of copy on the single photosensitive member based on the pattern data, each of the plurality of patterns corresponding to a group of pattern data;

storing in a memory means the group of pattern data for each of the plurality of patterns;

selecting and calling up from the memory means a desired group of pattern data corresponding to one of the plurality of patterns for laying out the images of the plurality of pages of copy on the single photosensitive member;

inputting the format data into the computational device; and combining the group of pattern data called up from the memory means with the format data input into the computational device to obtain a final format for producing the images of the plurality of pages of copy on the single photosensitive member.

2. A method according to claim 1, further comprising the step of storing in the memory means the format data set input into computational device.

3. A method according to claim 1, further comprising a step of modifying a part of the pattern data included in the group of pattern data called up from the memory means, and wherein a pattern data set including the modified pattern data and the format data input into the computational device are combined together in the combining step to obtain the final format for producing the images of the pages of copy on the single photosensitive member.

4. A method according to claim 3, further comprising a step of storing in the memory means a second group of pattern data that includes the modified pattern data.

5. A method according to any one of claims 1–4, wherein each of the groups of pattern data includes data relating to page order, a direction of a page top edge signatures, and a gripping direction of a printing machine, and the format data includes data relating to at least one of a size of plate, a size of one of the pages of copy, a breadth of a gutter, and a breadth of gripping.

6. A method according to claim 1, further comprising a step of using a process camera comprising a subject holder for supporting a plurality of pages of copy one at a time each including a page of copy or a combination of pages of copy, an objective lens, a movable platen for mounting a photosensitive member thereon, the movable platen being associated with movable mask plates, the subject holder, the objective lens and the movable platen being successively arranged in an order named along an optical path from the subject holder toward the platen through the objective lens, the arrangement being such that the pages of copy can be supported on the subject holder and exposed to light to produce respective images thereof which are focused by the objective lens and reproduced on the photosensitive member according to a programmed sequence.

7. A method of producing images of a plurality of pages of copy on a single photosensitive member comprising the steps of:

classifying data required for producing images into pattern data defined as the data relating to a layout of the plurality of pages of copy and format data defined as data relating to a size of the pages of copy;

storing in a memory means a pattern data group including a plurality of pattern data sets, each of the pattern data sets including a plurality of the pattern data therein;

storing in the memory means a format data group including a plurality of format data sets, each of the format data sets including a plurality of the format data therein;

selecting and calling up from the pattern data group stored in the memory means one of the pattern data sets;

selecting and calling up from the format data group stored in the memory means one of the format data sets;

modifying a part of the format data included in the format data set called up from the memory means; and combining the pattern data set called up from the memory means with the format data set including the modified format data to obtain a final format for producing the images of the pages of copy on the single photosensitive member.

* * * * *